United States Patent
Nagae et al.

(10) Patent No.: US 11,733,517 B2
(45) Date of Patent: Aug. 22, 2023

(54) OCULAR OPTICAL SYSTEM, MEDICAL VIEWER, AND MEDICAL VIEWER SYSTEM

(71) Applicant: Sony Corporation, Tokyo (JP)

(72) Inventors: Satoshi Nagae, Tokyo (JP); Takeshi Hatakeyama, Chiba (JP); Ichiro Tsujimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/622,963

(22) PCT Filed: Mar. 14, 2019

(86) PCT No.: PCT/JP2019/010450
§ 371 (c)(1),
(2) Date: Dec. 16, 2019

(87) PCT Pub. No.: WO2019/208005
PCT Pub. Date: Oct. 31, 2019

(65) Prior Publication Data
US 2021/0149198 A1 May 20, 2021

(30) Foreign Application Priority Data

Apr. 23, 2018 (JP) ................................. 2018-081967

(51) Int. Cl.
*G02B 27/01* (2006.01)
*G02B 30/25* (2020.01)
*G02B 27/02* (2006.01)

(52) U.S. Cl.
CPC ....... *G02B 27/0172* (2013.01); *G02B 27/022* (2013.01); *G02B 30/25* (2020.01); *G02B 2027/0178* (2013.01)

(58) Field of Classification Search
CPC .. G02B 27/0172; G02B 27/022; G02B 30/25; G02B 2027/0178; G02B 27/01;
(Continued)

(56) References Cited

U.S. PATENT DOCUMENTS 10,691,198 B1 * 6/2020 Gollier ................. G02B 27/281
11,042,039 B1 * 6/2021 Trail ....................... G06F 3/012
(Continued)

FOREIGN PATENT DOCUMENTS

CN      204 028 464 U    12/2014
EP      0 871 054 A2     10/1998
(Continued)

OTHER PUBLICATIONS

English Translation of CN204028464 (Year: 2014).*
(Continued)

*Primary Examiner* — James C. Jones
*Assistant Examiner* — Henry Duong
(74) *Attorney, Agent, or Firm* — Xsensus LLP

(57) ABSTRACT

The purpose is to provide a higher-quality three-dimensional image with a downsized optical system that does not need interpupillary adjustment. An ocular optical system according to the present disclosure includes, on an optical path viewed from an observer side, at least: a first polarization member; a mirror; a second polarization member; and an image display device in this order. A polarized state in the first polarization member and a polarized state in the second polarization member are orthogonal to each other.

11 Claims, 15 Drawing Sheets

(58) Field of Classification Search
CPC .......... G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0156; G02B 2027/0154; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC ......................................................... 359/630
See application file for complete search history.

(56) References Cited

U.S. PATENT DOCUMENTS

| 2001/0013972 | A1 | 8/2001 | Doany |
| 2002/0080481 | A1 | 6/2002 | Tachihara |
| 2004/0057138 | A1 | 3/2004 | Tanijiri |
| 2005/0156813 | A1* | 7/2005 | Adachi ................ H04N 13/395 345/1.3 |
| 2014/0139916 | A1 | 5/2014 | Doi |
| 2016/0116742 | A1 | 4/2016 | Wei |
| 2018/0003862 | A1* | 1/2018 | Benitez ................ H04N 13/344 |
| 2018/0067325 | A1 | 3/2018 | Yonekubo et al. |
| 2018/0107000 | A1* | 4/2018 | Sung .................... G02B 27/283 |

FOREIGN PATENT DOCUMENTS

| EP | 3 410 176 A1 | 12/2018 |
| JP | 8-166556 A | 6/1996 |
| JP | 2000-338416 A | 12/2000 |
| JP | 2000338412 A | 12/2000 |
| JP | 2003-8950 A | 1/2003 |
| JP | 03-623265 B2 | 2/2005 |
| JP | 2014-102419 A | 6/2014 |
| JP | 2016166930 A | 9/2016 |
| WO | 2015/125508 A1 | 8/2015 |
| WO | 2017/128187 A1 | 8/2017 |

OTHER PUBLICATIONS

English Translation of JP2000338416 (Year: 2000).*
English Translation of JP2003008950 (Year: 2003).*
English translation of CN204028464U (Year: 2014).*
International Search Report and Written Opinion dated May 28, 2018 for PCT/JP2019/010450 filed on Mar. 14, 2019, 10 pages including English Translation of the International Search Report.
Extended European Search Report dated May 20, 2020 in European Application No. 19793950.7.

* cited by examiner

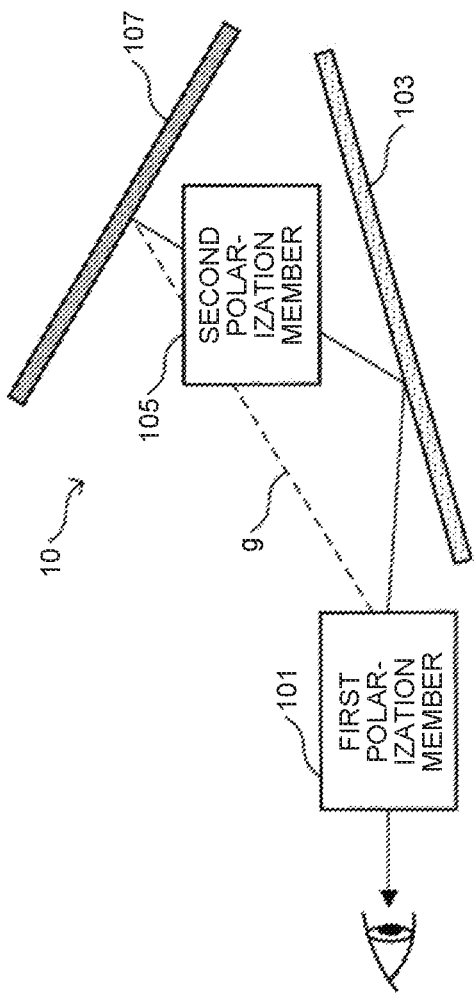

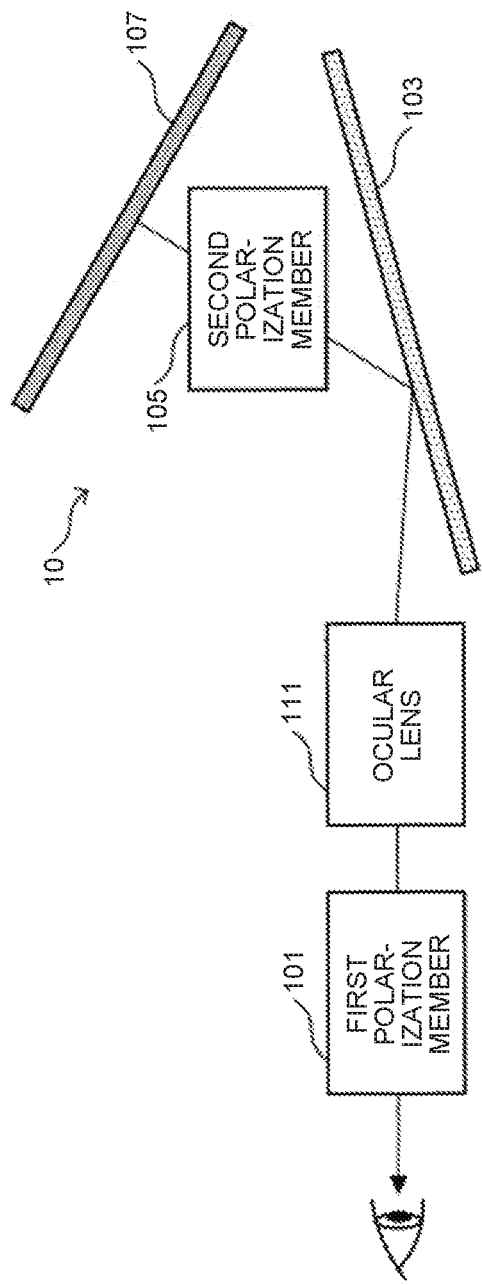

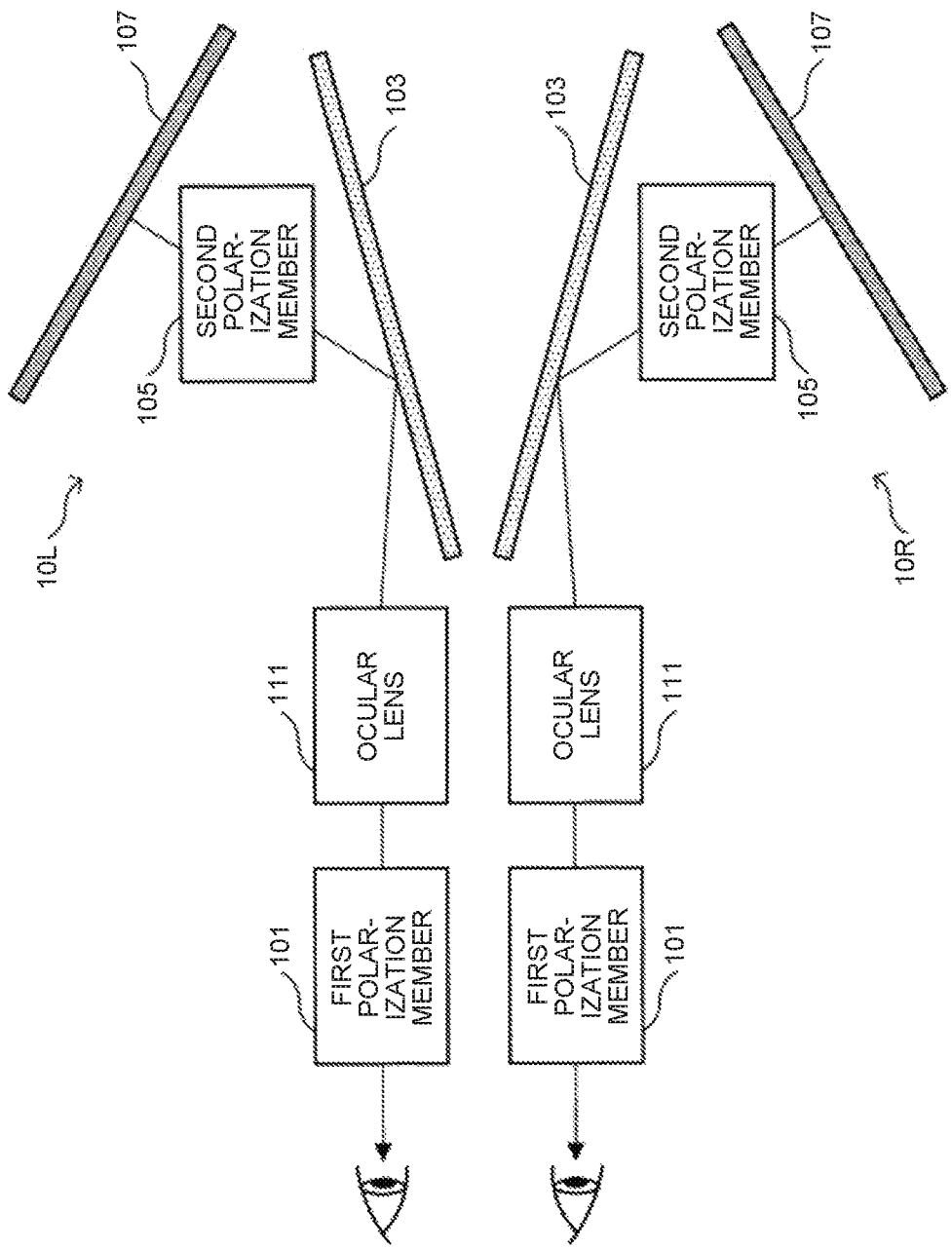

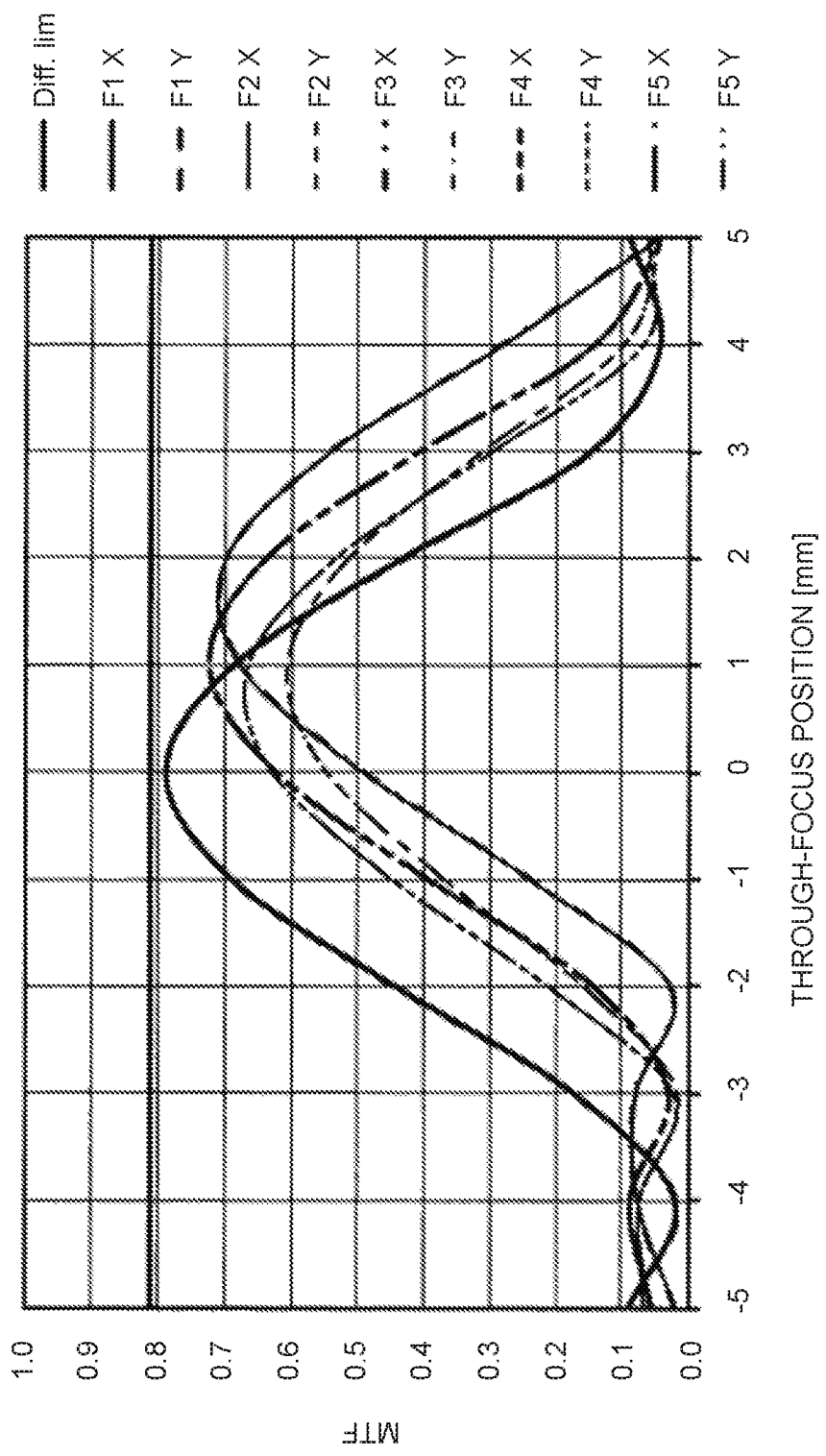

OCULAR OPTICAL SYSTEM, MEDICAL VIEWER, AND MEDICAL VIEWER SYSTEM

CROSS-REFERENCE TO RELATED APPLICATIONS

The present application is based on PCT filing PCT/JP2019/010450, filed Mar. 14, 2019, which claims priority to JP 2018-081967, filed Apr. 23, 2018, the entire contents of each are incorporated herein by reference.

FIELD

The present disclosure relates to an ocular optical system, a medical viewer, and a medical viewer system.

BACKGROUND

Conventionally, a 3D head-mount display (3D-HMD) as disclosed in Patent Literature 1 has been known as an example of an image display device. In the 3D-HMD, two ocular optical systems corresponding to each of a right eye and a left eye are disposed side by side at an interpupillary distance, and parallax images are displayed on image displays included in the ocular optical systems. In this manner, an observer wearing the 3D-HMD can three-dimensionally observe images displayed on the image displays.

CITATION LIST

Patent Literature

Patent Literature 1: WO 2015/125508

SUMMARY

Technical Problem

In the above-mentioned 3D-HMD, the interpupillary distance of the right and left ocular optical systems is required to be adjusted depending on an interpupillary distance of the observer by the observer before use. The interpupillary distance corresponds to a distance between a look position of the observer in the right eye ocular optical system and a look position of the observer in the left eye ocular optical system. The reason why preadjustment is required is that, when adjustment is not performed, an image appearing on the image display device is vignetted to produce an unobservable region. However, the work of adjusting the interpupillary distance described above is complicated, and the elimination of interpupillary adjustment is strongly required.

Furthermore, in the above-mentioned HMD configuration, the relative positions of the eye and the ocular optical system are fixed by the head-mount system literally. Thus, the above-mentioned HMD configuration cannot be used in the state where the user wears eyeglasses. Accordingly, the focus position of the ocular optical system needs to be adjusted (that is, diopter adjustment) depending on visual power of the observer.

The interpupillary adjustment and the diopter adjustment are complicated and required to be eliminated in medical sites where swiftness is required.

The distance between the right eye and the left eye of human are greatly different among individuals. In order to enable an image displayed on an image display device to be observed without vignetting even when the ocular optical system is used by observers having different interpupillary distances, the eye box (range within which virtual image is visually recognized) of the ocular optical system is required to be enlarged. In other words, in order to prevent vignetting of effective light beams even when the position of the eye is eccentric, the part effective diameter of a lens constituting the ocular optical system needs to be set to be large.

Depending on the size of an image display device used for an ocular optical system, when two ocular optical systems are arranged side by side at an interpupillary distance, an image display device in the right eye ocular optical system and an image display device in the left eye ocular optical system may interfere with each other to cause a problem. In this case, when the image display device used is downsized, the interference may be avoided. However, in practice, it is difficult to achieve both the enlargement of the eye box described above and the downsizing of the image display device for the following reasons.

The size of an observation image (virtual image of image appearing on image display device) is determined by specifications. Thus, when the image display device is downsized while maintaining the size of the observation image determined by specifications, the focal length of the ocular optical system is required to be shorten (in other words, the magnification of the ocular optical system is required to be enlarged). In this case, in consideration of the setting of a large effective diameter, the curvature of a lens needs to be decreased in order to secure the edge thickness of each lens constituting the ocular optical system, and power of each lens decreases. As a result, in order to compensate for small power of each lens, the number of lenses increases, and the ocular optical system is increased in size and weight.

For the reasons described above, there is a limit in terms of optical design to downsizing of the image display device, and hence it is conceivable to fold the optical path by a mirror. However, when such a folding configuration is employed, a virtual image that is not reflected by the mirror but directly reaches an observer is formed. Such a virtual image that is not reflected by the mirror but directly reaches the observer is called "ghost". When the ghost is generated, the observer sees originally unnecessary ghosts on both right and left sides of a three-dimensional image, which causes a problem of decrease in image quality.

Thus, in view of the above-mentioned circumstances, the present disclosure proposes an ocular optical system capable of providing a higher quality image with a downsized optical system that does not need interpupillary adjustment, and a medical viewer and a medical viewer system including the ocular optical system.

Solution to Problem

According to the present disclosure, an ocular optical system is provided that includes, on an optical path viewed from an observer side, at least: a first polarization member; a mirror; a second polarization member; and an image display device in this order, wherein a polarized state in the first polarization member and a polarized state in the second polarization member are orthogonal to each other.

Moreover, according to the present disclosure, a medical viewer, comprising an ocular optical system is provided that includes, on an optical path viewed from an observer side, at least: a first polarization member; a mirror; a second polarization member; and an image display device in this order, wherein a polarized state in the first polarization member and a polarized state in the second polarization member are orthogonal to each other.

Moreover, according to the present disclosure, a medical viewer system is provided that includes: an image processing unit for performing image processing on an image in which a surgical site that is a site subjected to surgery is taken, and outputting an obtained surgical site taken image; and a medical viewer for presenting the surgical site taken image output from the image processing unit to an observer, wherein the medical viewer includes an ocular optical system including, on an optical path viewed from an observer side, at least: a first polarization member; a mirror; a second polarization member; and an image display device in this order, and a polarized state in the first polarization member and a polarized state in the second polarization member are orthogonal to each other.

According to the present disclosure, light beams forming an image to be displayed on the image display device become a predetermined polarized state by the second polarization member, and are reflected by the reflection surface of the mirror to reach the first polarization member. The polarized state in the first polarization member and the polarized state in the second polarization member are orthogonal to each other, and hence light beams that have reached the first polarization member through the above-mentioned path are transmitted through the first polarization member to reach an observer, and light beams that have reached the first polarization member without being reflected by the mirror cannot be transmitted through the first polarization member.

Advantageous Effects of Invention

As described above, according to the present disclosure, a higher-quality image can be provided with a downsized optical system that does not need interpupillary adjustment.

The above-mentioned effect is not necessarily limited, and any effect described herein or other effects that could be understood from the specification may be exhibited together with or in place of the above-mentioned effect.

BRIEF DESCRIPTION OF DRAWINGS

FIG. 2 is an explanatory diagram schematically illustrating the ocular optical system according to the embodiment.

FIG. 3A is an explanatory diagram schematically illustrating the ocular optical system according to the embodiment.

FIG. 3B is an explanatory diagram schematically illustrating the ocular optical system according to the embodiment.

FIG. 14 is a graph for describing the ocular optical system in the fourth example.

DESCRIPTION OF EMBODIMENTS

Referring to the accompanying drawings, preferred embodiments of the present disclosure are described in detail below. In the specification and the drawings, components having substantially the same functional configurations are denoted by the same reference symbols to omit overlapping descriptions.

The descriptions are given in the following order:
1. Embodiments
  1.1 Ocular optical system
  1.2 Medical viewer, medical viewer system, and surgical system
2. Examples

EMBODIMENTS

<Ocular Optical System>

First, an ocular optical system according to a first embodiment of the present disclosure is described in detail with reference to FIG. 1A to FIG. 7.

Figure 4:
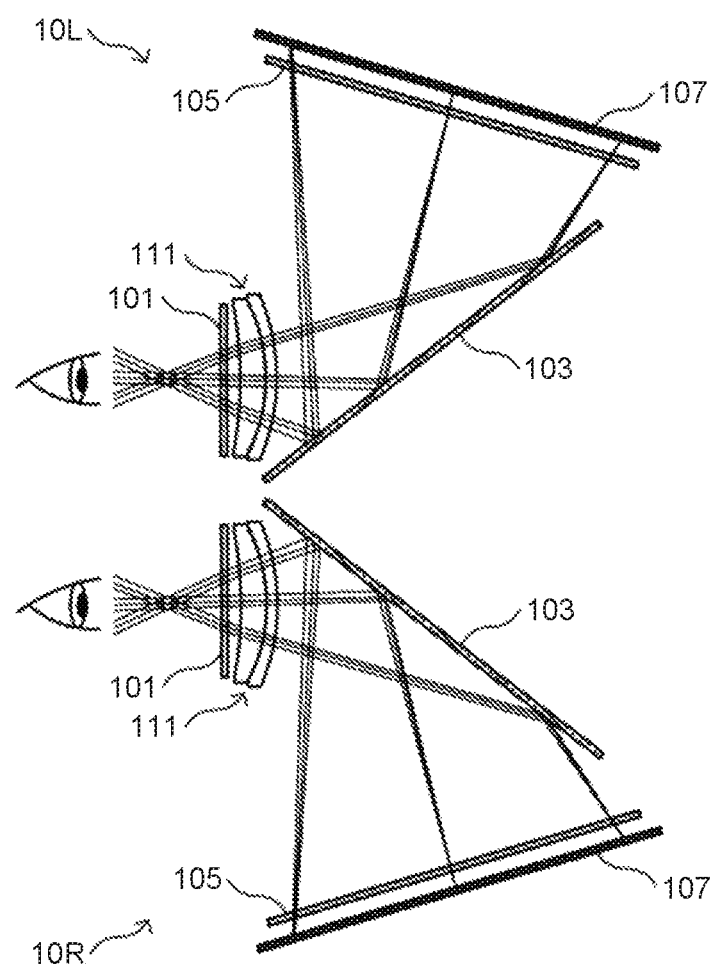
FIG. 4 is an explanatory diagram schematically illustrating an example of the ocular optical system according to the embodiment.
Figure 5:
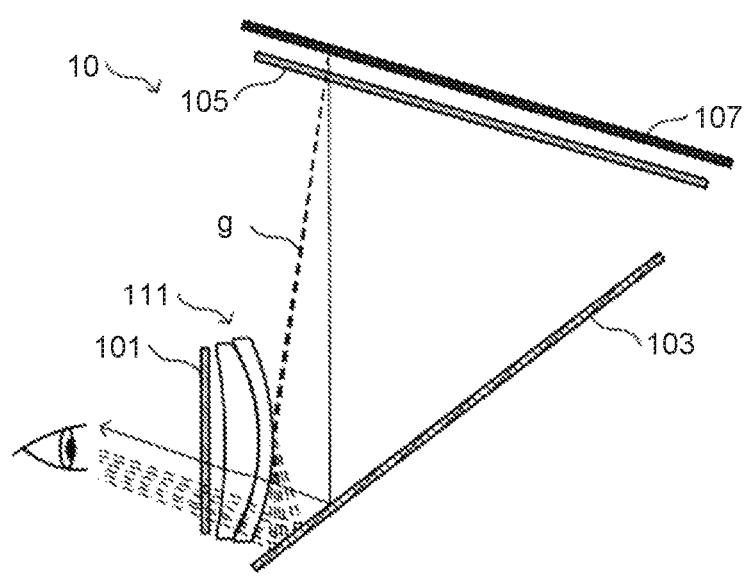
FIG. 5 is an explanatory diagram for describing an ocular lens in the ocular optical system according to the embodiment.
Figure 6:
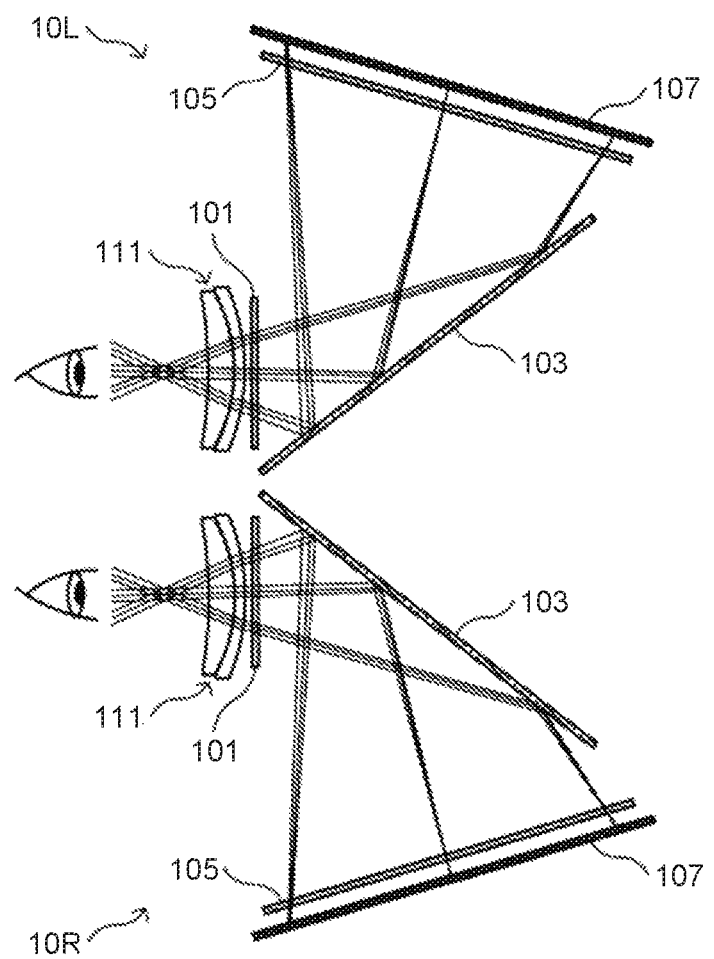
FIG. 6 is an explanatory diagram for describing the ocular lens in the ocular optical system according to the embodiment.
Figure 7:
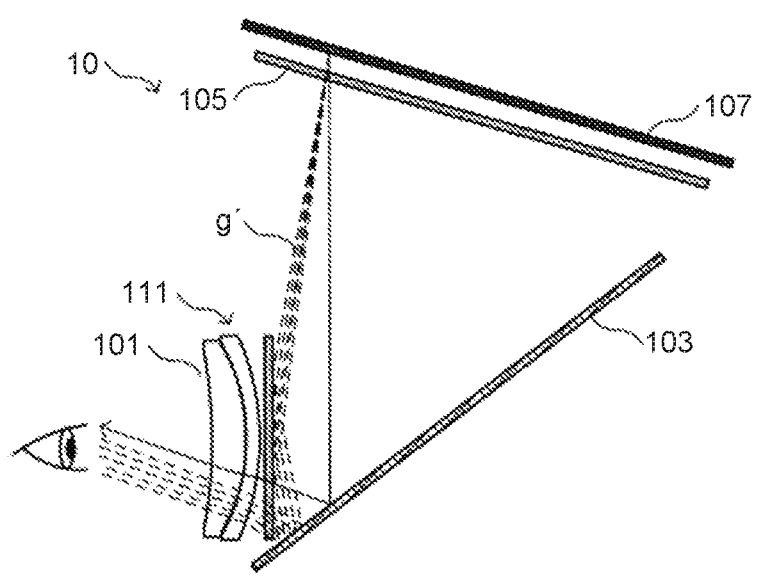
FIG. 7 is an explanatory diagram for describing the ocular lens in the ocular optical system according to the embodiment.

FIG. 1A to FIG. 3B are explanatory diagrams schematically illustrating the ocular optical system according to the present embodiment. FIG. 4 is an explanatory diagram schematically illustrating an example of the ocular optical system according to the present embodiment. FIG. 5 to FIG. 7 are explanatory diagrams for describing an ocular lens in the ocular optical system according to the present embodiment.

Figure 1A:
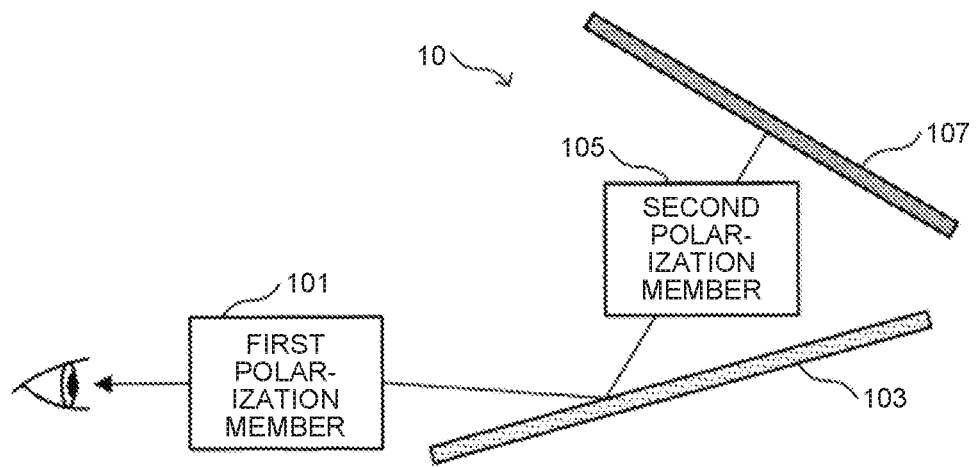
FIG. 1A is an explanatory diagram schematically illustrating an ocular optical system according to an embodiment of the present disclosure.

The ocular optical system according to the present embodiment an optical system for causing an image displayed on an image display device to reach an eye of an observer when the observer looks into the ocular optical system. In an ocular optical system 10, as schematically illustrated in FIG. 1A, at least a first polarization member 101, a mirror 103, a second polarization member 105, and an image display device 107 are disposed in this order on an optical path viewed from the observer side. As illustrated in FIG. 1A, in the ocular optical system 10 according to the present embodiment, the optical path is bent by the mirror 103, and hence an optical design capable of enlarging the eye box and downsizing the image display device 107 while eliminating the need of interpupillary adjustment can be achieved. The ocular optical system 10 according to the present embodiment can be implemented without employing what is called head-mount system, and hence even when an observer wears eyeglasses, the observer can observe an image output to the image display device 107 without diopter adjustment.

Figure 1B:
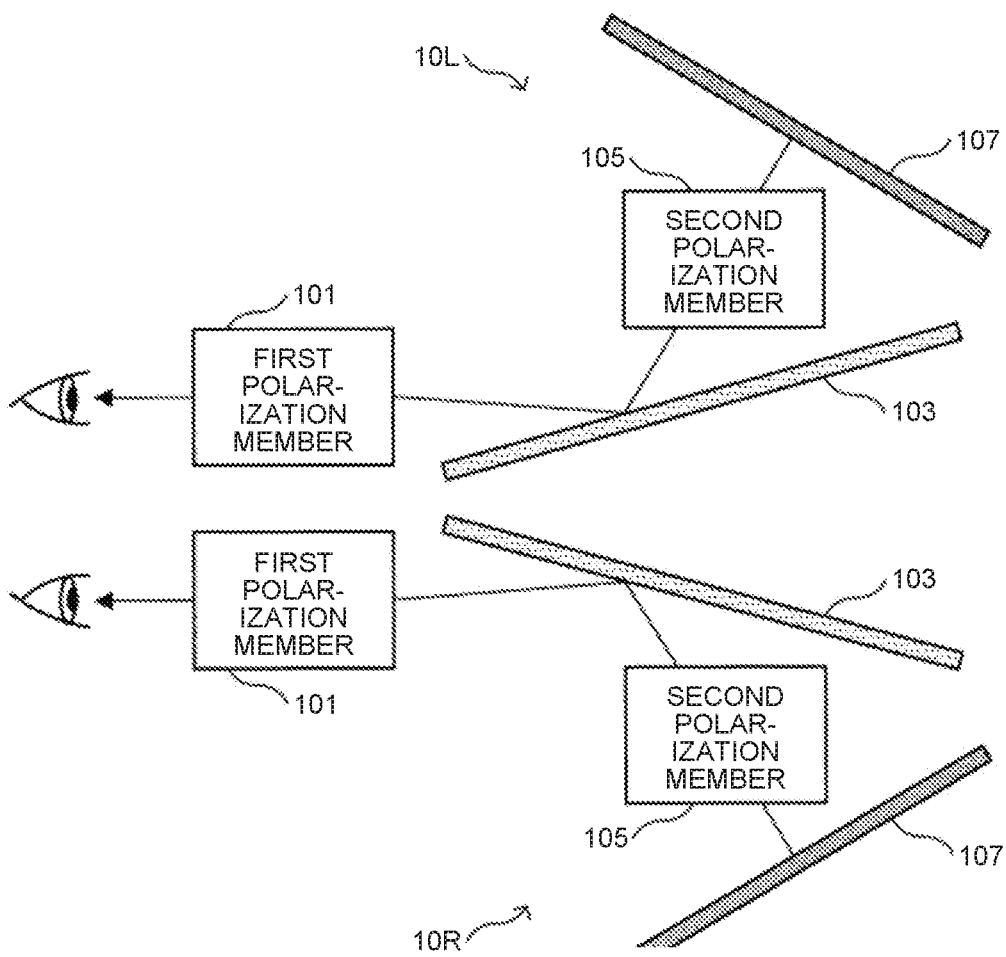
FIG. 1B is an explanatory diagram schematically illustrating the ocular optical system according to the embodiment.

FIG. 1A illustrates the monocular ocular optical system 10, but as illustrated in FIG. 1B, two ocular optical systems 10 illustrated in FIG. 1A may be used such that one of the ocular optical systems 10 is an ocular optical system 10L for a left eye and the other is an ocular optical system 10R for a right eye. When the pair of right and left ocular optical systems 10L and 10R as illustrated in FIG. 1B are provided and parallax images are displayed from the image display devices 107 provided in the ocular optical systems 10L and 10R, the observer can observe a three-dimensional image. In the following description, the two ocular optical systems 10L and 10R are sometimes collectively referred to as "ocular optical systems 10".

In the ocular optical system 10 according to the present embodiment as illustrated in FIG. 1A and FIG. 1B, a polarized state in the first polarization member 101 and a polarized state in the second polarization member 105 are orthogonal to each other. Light beams to form an image displayed on the image display device 107 become a predetermined polarized state by the second polarization member 105, and are reflected by a reflection surface of the mirror 103 and then reach the first polarization member 101. On the reflection surface of the mirror 103, the polarized state of the light beams changes, due to the reflection, from a polarized state given by the second polarization member 105 to a polarized state orthogonal to the polarized state. As described above, the polarized state in the first polarization member 101 and the polarized state in the second polarization member 105 are orthogonal to each other, and hence light beams that have reached the first polarization member 101 through the above-mentioned path are transmitted through the first polarization member 101 to reach the observer without attenuating the light amount.

On the other hand, light beams that have reached the first polarization member 101 without being reflected by the mirror 103 (for example, direct image ghost g schematically illustrated in FIG. 2) cannot be transmitted through the first polarization member 101 because the polarized state thereof is still the polarized state given by the second polarization member 105. In this manner, the direct image ghost g that has reached the first polarization member 101 without being reflected by the mirror 103 does not reach the observer, and hence the light amount of the direct image ghost g can be attenuated to increase the quality of images provided to the observer.

As described above, by using two polarization members whose polarized states are orthogonal to each other in combination, an effect that effective light beams reliably reach an observer while preventing direct image ghosts from reaching the observer can be exerted.

When an optical path folding structure such as the ocular optical system according to the present embodiment is employed, light beams of the direct image ghost g (hereinafter sometimes referred to as "ghost light beams") pass near the lens effective diameter. Thus, when the lens effective diameter is increased to downsize the image display device 107 and the need of interpupillary adjustment is eliminated, there is a tradeoff that the ghost light beams easily reach an observer. However, by using two polarization members 101 and 105 whose polarized states are orthogonal to each other in combination as described above, the direct image ghost can be effectively blocked.

In the ocular optical system 10 according to the present embodiment, the first polarization member 101 and the second polarization member 105 are not particularly limited, and a combination of any publicly known polarization members can be used.

For example, the first polarization member 101 and the second polarization member 105 may be linear polarizing plates. The first polarization member 101 and the second polarization member 105 may be circular polarizing plates each formed from a linear polarizing plate and a ¼ wavelength plate (λ/4 plate).

When the first polarization member 101 and the second polarization member 105 are linear polarizing plates, the linear polarizing plates only need to be installed such that the direction of polarization axis (polarization direction) of one linear polarizing plate is, for example, −45° and the polarization direction of the other linear polarizing plate is, for example, +45°. In this manner, the polarized states orthogonal to each other can be easily created. When the first polarization member 101 and the second polarization member 105 are circular polarizing plates, the cost increases as compared with the case where a linear polarizing plate is used, but the adjustment of a combination of polarization directions as in a linear polarizing plate becomes unnecessary, and hence the alignment (adjustment and assembly) of the ocular optical system is facilitated.

The combination of the first polarization member 101 and the second polarization member 105 is not limited to the above-mentioned examples. For example, the first polarization member 101 may be a linear polarizing plate, and the second polarization member 105 may be a ½ wavelength plate (λ/2 plate). The reason is that the image display device 107 (for example, liquid crystal display (LCD)) generally emits linearly polarized light by itself, and hence the second polarization member 105 is not required to be a linear polarizing plate and a desired polarization direction can be obtained by using a 2 plate. When this concept is pushed forward, the second polarization member 105 itself can be eliminated by setting the polarization directions of emission light of LCDs to ±45 degrees. The first polarization member 101 may be a linear polarizing plate, and the second polarization member 105 may be a polarization member in which a linear polarizing plate and a ½ wavelength plate are disposed in this order from the observer side.

In the case of installing the first polarization member 101 and the second polarization member 105 as described above, the polarization members may be installed while being bonded to protective glass of an image display device (such as LCD). By installing the first polarization member 101 and the second polarization member 105 in this manner, the possibility of condensation of the polarization member caused by temperature difference between heat generated from the image display device 107 and low-temperature air ahead can be suppressed to further increase the quality of images provided to the observer. However, when the polarization member is simply bonded to protective glass, dust adhering to the surface of the polarization member is easily recognized. Thus, when bonding the polarization member to protective glass, it is preferred to pay attention to the presence of attachment on the surfaces of the polarization member and the protective glass.

It is preferred that the sizes of the first polarization member 101 and the second polarization member 105 be set depending on the size of the image display device 107.

The mirror 103 is a member for reflecting light beams that have been emitted from the image display device 107 and become a predetermined polarized state by the second polarization member 105 by a reflection surface thereof to guide the light beams toward the first polarization member 101. When the light beams are reflected by the reflection surface of the mirror 103, the polarized state of the light beams changes to a state orthogonal to the polarized state given by the second polarization member 105. In this manner, the light beams reflected by the mirror 103 can be transmitted through the first polarization member 101.

The mirror 103 is not particularly limited, and various kinds of publicly known mirrors can be used as appropriate. It is preferred to use a mirror having a higher reflectivity. As such a mirror, a metal (for example, aluminum) deposition mirror and a dielectric multi-layer mirror has been publicly known. As the mirror 103 according to the present embodiment, it is preferred to use a metal deposition mirror. The reason is described by way of the ocular optical system 10L in FIG. 4.

It is understood that light beams that have been emitted from the left of the screen to reach the eye of the observer have a larger incident angle to the mirror measured from the normal to the mirror than light beams that have been emitted from the right of the screen to reach the eye of the observer. A dielectric multi-layer mirror is formed by depositing multiple optical thin films on a base to implement reflection characteristics in a visible light wavelength bandwidth, but it is known that spectroscopic characteristics change depending on the incident angle. Thus, if a dielectric multi-layer mirror is used as the mirror 103 in the optical configuration of the ocular optical system according to the present embodiment, the light beams that have been emitted from the left of the screen to reach the eye of the observer become more bluish than the light beams that have been emitted from the right of the screen to reach the eye of the observer. Such a state is color shading of images, and is not preferable because authentic color reproduction is required in medical fields (for example, surgery).

It is preferred that the size of the mirror 103 be set depending on the size of the image display device 107. It is preferred that the installation angle of the mirror 103 (for example, an angle between the reflection surface of the mirror 103 and the optical axis of the first polarization member 101) be set such that light of all images displayed on a display screen of the image display device 107 can be guided to the observer.

On the display screen of the image display device 107, various kinds of images are displayed and presented to an observer. The image display device 107 according to the present embodiment is not particularly limited, and, for example, various kinds of publicly known displays such as a liquid crystal display and an organic electro-luminescence (EL) display can be used.

It is preferred that the size of the image display device 107 be as small as possible in a range where the interpupillary adjustment is not required and the eye box can be enlarged.

As schematically illustrated in FIG. 3A and FIG. 3B, it is preferred that the ocular optical system 10 according to the present embodiment further include an ocular lens 111 on an optical path between the first polarization member 101 and the mirror 103. By providing the ocular lens 111, an image displayed on the display screen of the image display device 107 can be enlarged and provided to the observer. Thus, the image display device 107 can be further downsized by providing the ocular lens 111.

Such an ocular lens 111 may be a single lens or may be a lens group including a plurality of lenses. The lens surface of the ocular lens 111 may be a spherical surface or an aspherical surface. Furthermore, glass material of the ocular lens 111 is not particularly limited, and any publicly known glass material can be used as appropriate.

In the ocular optical system 10 according to the present embodiment, it is preferred that a lens surface of the ocular lens 111 on the mirror 103 side (when the ocular lens 111 is formed of a lens group, at least a lens surface of a lens located closest to the mirror 103 on the mirror 103 side) have a convex curvature as exemplified in FIG. 4.

When the optical path is folded as in the ocular optical system 10 according to the present embodiment, the following ghost may be generated other than the direct image ghost g described above. Specifically, light beams that have emitted from the image display device 107 and been transmitted through the second polarization member 105 may reach the surface of the ocular lens 111, light beams that have been reflected by the surface of the ocular lens 111 may reach the mirror 103, and light beams that have reached the mirror 103 may be transmitted through the ocular lens 111 and the first polarization member 101 to reach the observer. Such light beams are hereinafter referred to as "lens reflected image ghost g'".

As exemplified in FIG. 4, at least the curvature of a lens surface located closest to the mirror 103 has a convex curvature, and hence only tangent components of the convex surface of the ocular lens 111 among ghost light fluxes are reflected to reach the mirror 103 and are prevented from reaching the observer. In other words, the convex surface of the ocular lens 111 serves as a diffusion mirror to diffuse ghost light beams, and the luminance of ghost light flux per unit on an observation eye can be suppressed. When light beam tracking simulation was actually performed, as schematically illustrated in FIG. 5, it was revealed that the light flux of the lens reflected image ghost g' is thin and the brightness is low (in other words, the F-number of the lens reflected image ghost g' is large). In this manner, by providing the ocular lens 111 between the first polarization member 101 and the mirror 103, the direct image ghost and the lens reflected image ghost can be suppressed to achieve a more excellent quality image.

On the reflection surface of the mirror 103, a shield for blocking reflection light (lens reflected image ghost) reflected by the mirror 103 may be provided near a position at which reflection light reflected by a lens surface of the ocular lens 111 on the mirror 103 side among light beams emitted from the image display device 107 reaches the reflection surface of the mirror 103. Instead of the shield, a member for absorbing a lens reflected image ghost may be provided so that the lens reflected image ghost is not reflected by the reflection surface of the mirror 103. By providing such a mechanism, the image quality can be further improved.

As exemplified in FIG. 6, it is conceivable to dispose the ocular lens 111 on the observer side of the first polarization member 101. Also in this case, an effect that effective light beams are reliably transmitted while suppressing the direct image ghost can be achieved. However, when the first polarization member 101 is located on the mirror 103 side of the ocular lens 111, the surface of the first polarization member 101 may serve as a plane mirror, and, for example, as schematically illustrated in FIG. 7, all ghost light fluxes are reflected by the surface of the first polarization member 101 to reach the observer. Thus, the luminance of the ghost light fluxes cannot be suppressed.

When the magnification of the above-mentioned ocular lens 111 is B, it is preferred that a relation of $3<R<5$ be established. When the magnification β of the ocular lens 111 is 3 or less, the focal length of the ocular lens 111 can be increased to enlarge the eye box, but the size of the image display device 107 increases. In this case, when binocular optical systems as illustrated in FIG. 1B and FIG. 3B are set, it may be difficult to avoid interference (physical close) between two image display devices 107. On the other hand, when the magnification β of the ocular lens 111 is 5 or more, the image display device 107 can be easily downsized, but the focal length of the ocular lens 111 decreases and the eye box is narrow, which cannot respond to eye swinging. The magnification β of the ocular lens 111 is more preferably more than 3.5 and less than 4.5 and still more preferably more than 3.7 and less than 4.3.

When the angular magnification of the above-mentioned ocular lens 111 is γ, it is preferred that a relation of 1.2<γ<1.5 be established. When the angular magnification γ of the ocular lens 111 is 1.2 or less, the focal length of the ocular lens 111 can be increased to enlarge the eye box, but the size of the image display device 107 may increase, which is not preferable. On the other hand, when the angular magnification γ of the ocular lens 111 is 1.5 or more, the image display device 107 can be easily downsized, but the focal length of the ocular lens 111 decreases and the eye box is narrow, which cannot respond to eye swinging and which is not preferable. The angular magnification γ of the ocular lens 111 is more preferably more than 1.2 and less than 1.4 and still more preferably more than 1.2 and less than 1.3.

The ocular optical system 10 according to the present embodiment has been described above in detail with reference to FIG. 1A to FIG. 7.

<Medical Viewer, Medical Viewer System, and Surgical System>

Figure 8:
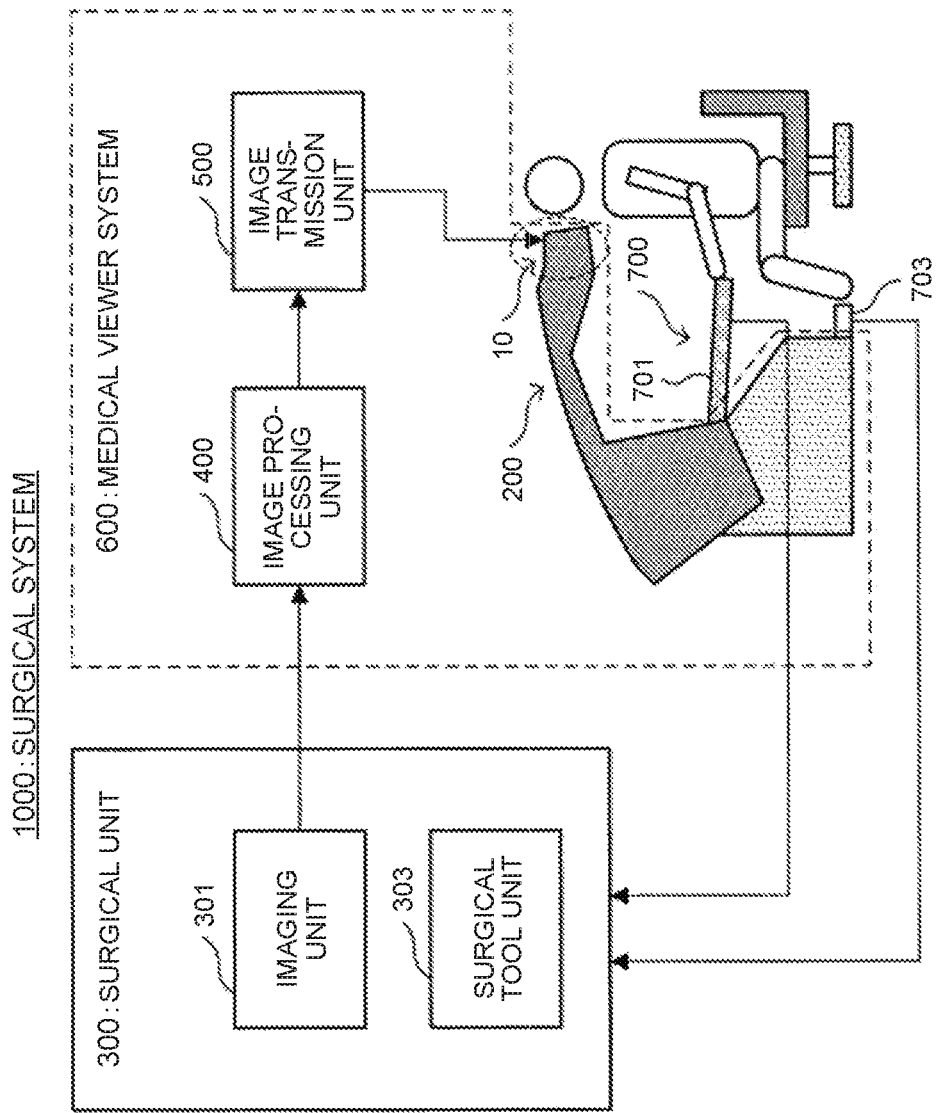
FIG. 8 is an explanatory diagram for describing a medical viewer, a medical viewer system, and a surgical system including the ocular optical system according to the embodiment.

Next, a medical viewer 200 and a medical viewer system 600 including the ocular optical system 10 according to the present embodiment and a surgical system 1000 including the medical viewer 200 are briefly described with reference to FIG. 8. FIG. 8 is an explanatory diagram for describing the medical viewer, the medical viewer system, and the surgical system including the ocular optical system according to the present embodiment.

As schematically illustrated in FIG. 8, a surgical system 1000 according to the present embodiment includes a surgical unit 300 and a medical viewer system 600. For example, as schematically illustrated in FIG. 8, the medical viewer system 600 according to the present embodiment includes a medical viewer 200, an image processing unit 400, and an image transmission unit 500. FIG. 8 illustrates the case where the medical viewer system 600 according to the present embodiment includes the image transmission unit 500, but the medical viewer system 600 is not necessarily required to include the image transmission unit 500.

Furthermore, it is preferred that the surgical system 1000 according to the present embodiment include an operation unit 700 for operating the surgical unit 300 in addition to the surgical unit 300 and the medical viewer system 600 described above.

The medical viewer 200 according to the present embodiment is one of the devices constituting the medical viewer system 600, and displays various kinds of images taken by a imaging unit 301 in the surgical unit 300 described later to provide various kinds of images taken by the imaging unit 301 to the user such as a doctor. In the medical viewer 200, the ocular optical system 10 as described above is mounted near an ocular unit (region surrounded by broken line in FIG. 8), into which the user such as a doctor looks.

As described above, the ocular optical system 10 according to the present embodiment can provide a higher-quality image with the downsized optical system that does not need diopter adjustment and interpupillary adjustment. Consequently, the user such as a doctor can observe a high-quality taken image (surgical site taken image) related to a surgical site (site subjected to surgery) by simply looking into the ocular unit without performing diopter adjustment and interpupillary adjustment.

The medical viewer 200 according to the present embodiment having the functions described above is constituted by various kinds of hardware, such as a central processing unit (CPU), a read only memory (ROM), a random access memory (RAM), an input device, an output device, and a communication device.

As described above, in the surgical system 1000 according to the present embodiment, it is preferred that the operation unit 700 used for a user such as a doctor to operate the surgical unit 300 be provided as a unit different from the surgical unit 300 and the medical viewer system 600. The operation unit 700 is provided with an operation arm 701 to be operated by a user such as a doctor with his/her hand and an operation pedal 703 to be operated by the user such as a doctor with his/her foot. The operation unit 700 may be provided with, in addition to the above-mentioned configuration, various kinds of buttons (not shown) for operating the surgical unit 300. By operating the operation arm 701 and the operation pedal 703, the user such as a doctor can control the imaging unit 301 and a surgical tool unit 303 provided in the surgical unit 300 to a desired state.

Specifically, the user such as a doctor can operate the operation arm 701 and/or the operation pedal 703 while observing an image provided from the ocular optical system 10 in the medical viewer 200, to control the imaging position or imaging magnification of the imaging unit 301 and operate various kinds of surgical tools provided to the surgical tool unit 303, such as a high-frequency knife, forceps, and a snare wire.

The user such as a doctor operates the operation unit 700 while observing a surgical site taken image of a surgical site, and hence it is preferred that the operation unit 700 be provided near the medical viewer 200, and the medical viewer 200 and the operation unit 700 may be integrated.

The surgical unit 300 is connected to each of the medical viewer system 600 and the operation unit 700 in a wired or wireless manner. In the surgical unit 300, the imaging unit 301 and the surgical tool unit 303 operate based on user operation information on operation of the user such as a doctor transmitted from the operation unit 700. In this manner, even when the user such as a doctor is located at a position away from a patient having surgery, surgical operation can be performed on the patient.

The imaging unit 301 may be, for example, various kinds of imaging cameras provided near a shadowless lamp, or may be various kinds of camera units provided to an endoscope unit or a microscope unit. Images taken by the imaging unit 301 as needed are transmitted to the image processing unit 400 included in the medical viewer system 600.

The surgical tool unit 303 is a unit in which surgical tools used for various kinds of surgery, such as a high-frequency knife, forceps, and a snare wire, are held by various kinds of robot arms (not shown). The surgical tool unit 303 operates in response to user operation performed on the operation arm 701 and/or the operation pedal 703 in the operation unit 700.

The image processing unit 400 is, for example, an example of a processor unit implemented by a CPU, a ROM, a RAM, an input device, an output device, and a communication device. The image processing unit 400 is connected to each of the medical viewer 200 and the surgical unit 300 in a wired or wireless manner. The image processing unit 400 performs predetermined image processing on images obtained by taking a surgical site by the imaging unit 301 in the surgical unit 300 as needed, to obtain surgical site taken images. The image processing performed by the image processing unit 400 is not particularly limited, and various kinds of publicly known image processing such as demosaicing are performed. When the image processing unit 400 generates a surgical site taken image, the image processing unit 400 outputs the generated surgical site taken image to the image transmission unit 500.

The image processing unit 400 can combine a 2D/3D image supplied from the imaging unit 301 (for example, a camera unit provided to an endoscope unit or a microscope unit) and a processed image (auxiliary image) such as a user interface (UI) so that a combined image superimposed with various kinds of information is generated as a surgical site taken image. It is preferred that the image processing unit 400 have various kinds of terminals, such as a DVI terminal, for outputting the above-mentioned surgical site taken image to an external output device such as an external monitor provided outside. Furthermore, the image processing unit 400 can transmit voice information to the image transmission unit 500.

The image transmission unit 500 is, for example, an example of a relay unit implemented by a CPU, a ROM, a RAM, an input device, an output device, and a communication device, and functions as a relay box for outputting a surgical site taken image output from the image processing unit 400 to the medical viewer 200. Thus, when the relay of transmission and reception of information between the image processing unit 400 and the medical viewer 200 is unnecessary, the image transmission unit 500 is not necessarily required to be provided in the medical viewer system 600 according to the present embodiment.

The image transmission unit 500 is connected to each of the medical viewer 200 and the image processing unit 400 in a wired or wireless manner. The image transmission unit 500 transmits a surgical site taken image output from the image processing unit 400 to a medical user. In this manner, the surgical site taken image is presented to an observer such as a doctor using the medical viewer 200.

It is preferred that the image transmission unit 500 have various kinds of terminals such as a DVI terminal for outputting a surgical site taken image supplied from the image processing unit 400 to an external output device such as an external monitor provided outside. The image transmission unit 500 can transfer images input from various kinds of terminals such as a DVI terminal to the medical viewer 200. Furthermore, the image transmission unit 500 has terminals for connection to various kinds of training devices, and may have a function for outputting training images input from the training devices to the medical viewer 200 and an external output device such as an external monitor.

FIG. 8 illustrates that the image processing unit 400 and the image transmission unit 500 are separate devices, but each of the image processing unit 400 and the image transmission unit 500 may be implemented as a function of a single control device.

The medical viewer 200, the medical viewer system 600, and the surgical system 1000 according to the present embodiment have been briefly described above.

EXAMPLES

The ocular optical system according to the present disclosure is more specifically described below by way of examples. The following examples are merely examples of the ocular optical system according to the present disclosure, and the ocular optical system according to the present disclosure is not limited to the following examples.

First Example

In a first example described below, the same right and left ocular optical systems each having an ocular lens formed of two lenses illustrated in FIG. 4 were designed, and image forming simulation was performed.

The simulation assumed that a first polarization member 101 and a second polarization member 105 were present while being bonded to protective glass. As an image display device 107, a liquid crystal display panel (5.2 inch, half-diagonal: 66.1 mm) was used. The liquid crystal display panel is a liquid crystal display panel having a resolution of full HD (1920×1080 pixels). Furthermore, an angle between a reflection surface of a mirror 103 and an optical axis of the ocular lens was 37 degrees.

Figure 9:
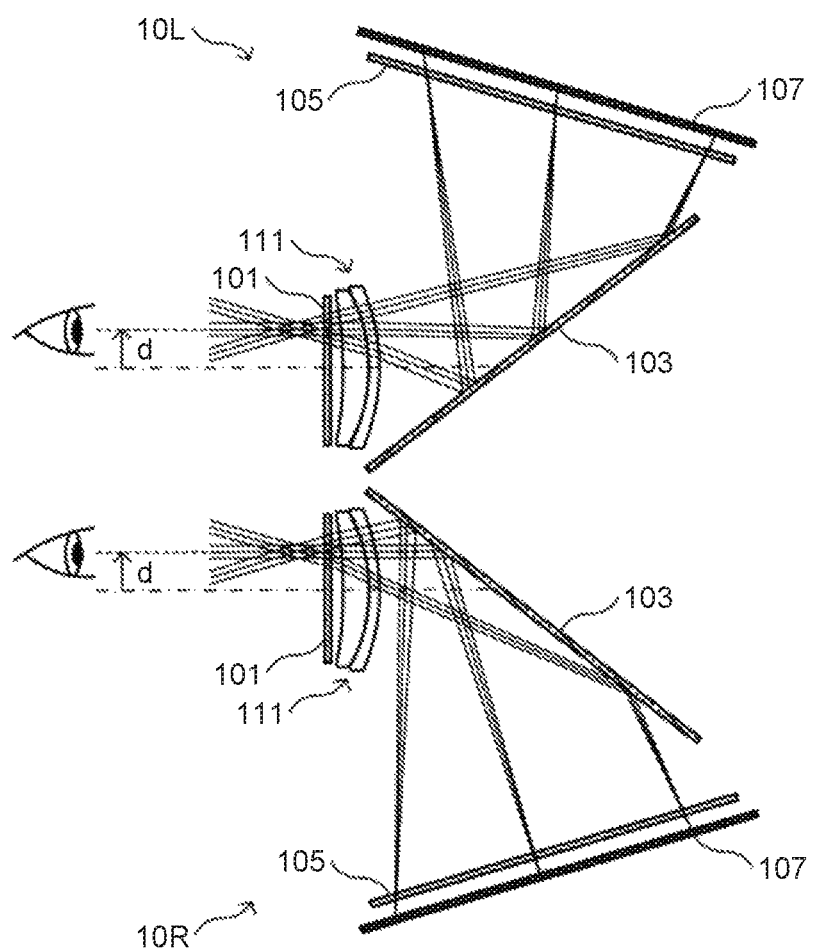
FIG. 9 is an explanatory diagram for describing an ocular optical system in a first example.

Eye relief was at a position of 20 mm from a lens surface, and the distance (virtual image distance) from an eye to a virtual image of the liquid crystal display panel (LCD panel) was 550 mm. The right and left LCD panels were offset by 4.923 mm in the horizontal direction to set the binocular convergence distance to 870 mm. A reference interpupillary distance was 62 mm, and eye relief was set so as to respond to eye swinging of ±10.72 mm in the horizontal direction. FIG. 9 schematically illustrates a light beam diagram during the maximum eye swinging.

Other setting conditions are collectively indicated in Table 1 below. Lens parameters in the ocular optical system in the first example are as indicated in Table 2.

TABLE 1

|  |  | First example |
|---|---|---|
| Image display unit | Panel (inch) | 5.2 |
|  | Panel V/2 (mm) | 32.4 |
|  | Panel H/2 (mm) | 57.6 |
|  | Pixel pitch (mm) | 0.060 |
|  | Nyquist frequency (lp/mm) | 8 |
| Ocular lens | Magnification β | 3.98 |
|  | Angular magnification γ | 1.25 |
|  | Focal length (mm) | 172.12 |
| Horizontal angle of view 2ω (deg) |  | 47.0 |
| Optical distortion diagonal (%) |  | −4.19 |
| Virtual image distance (mm) |  | 550 |
| Panel offset (mm) |  | 4.923 |
| Convergence distance (mm) |  | 870 |

TABLE 2

| Surface number | Surface name | Curvature of radius | Surface interval | d-line refractive index | d-line Abbe number | Aperture radius |
|---|---|---|---|---|---|---|
| Object |  | ∞ | −550.0000 |  |  |  |
| Stop surface | Eye relief | ∞ | 20.0000 |  |  | 2.0000 |

TABLE 2-continued

| Surface number | Surface name | Curvature of radius | Surface interval | d-line refractive index | d-line Abbe number | Aperture radius |
|---|---|---|---|---|---|---|
| 2 | Protective glass | ∞ | 1.1000 | 1.47140 | 65.53 | 22.3088 |
| 3 | First polarization member | ∞ | 0.2200 | 1.52512 | 56.28 | 22.6550 |
| 4 |  | ∞ | 3.2000 |  |  | 22.7216 |
| 5 | First ocular lens | −129.5000 | 10.0000 | 1.77250 | 49.62 | 23.2644 |
| 6 |  | −46.7600 | 0.5000 |  |  | 24.9732 |
| 7 | Second ocular lens | −47.4900 | 2.0000 | 1.84666 | 23.78 | 25.0615 |
| 8 |  | −67.3400 | 39.8130 |  |  | 26.4065 |
| 9 | Mirror | ∞ | 0.0000 |  |  | 79.6115 |
| 10 |  | ∞ | −94.4130 |  |  | 40.3548 |
| 11 |  | ∞ | 0.0000 |  |  | 66.5581 |
| 12 | Second polarization member | ∞ | −0.2200 | 1.52512 | 56.28 | 66.5581 |
| 13 | Protective glass | ∞ | −0.8500 | 1.51680 | 64.17 | 66.6177 |
| 14 |  | ∞ | −0.1000 |  |  | 66.8492 |
| Image | Image display unit | ∞ | 0.0000 |  |  | 66.8927 |

Figure 10:
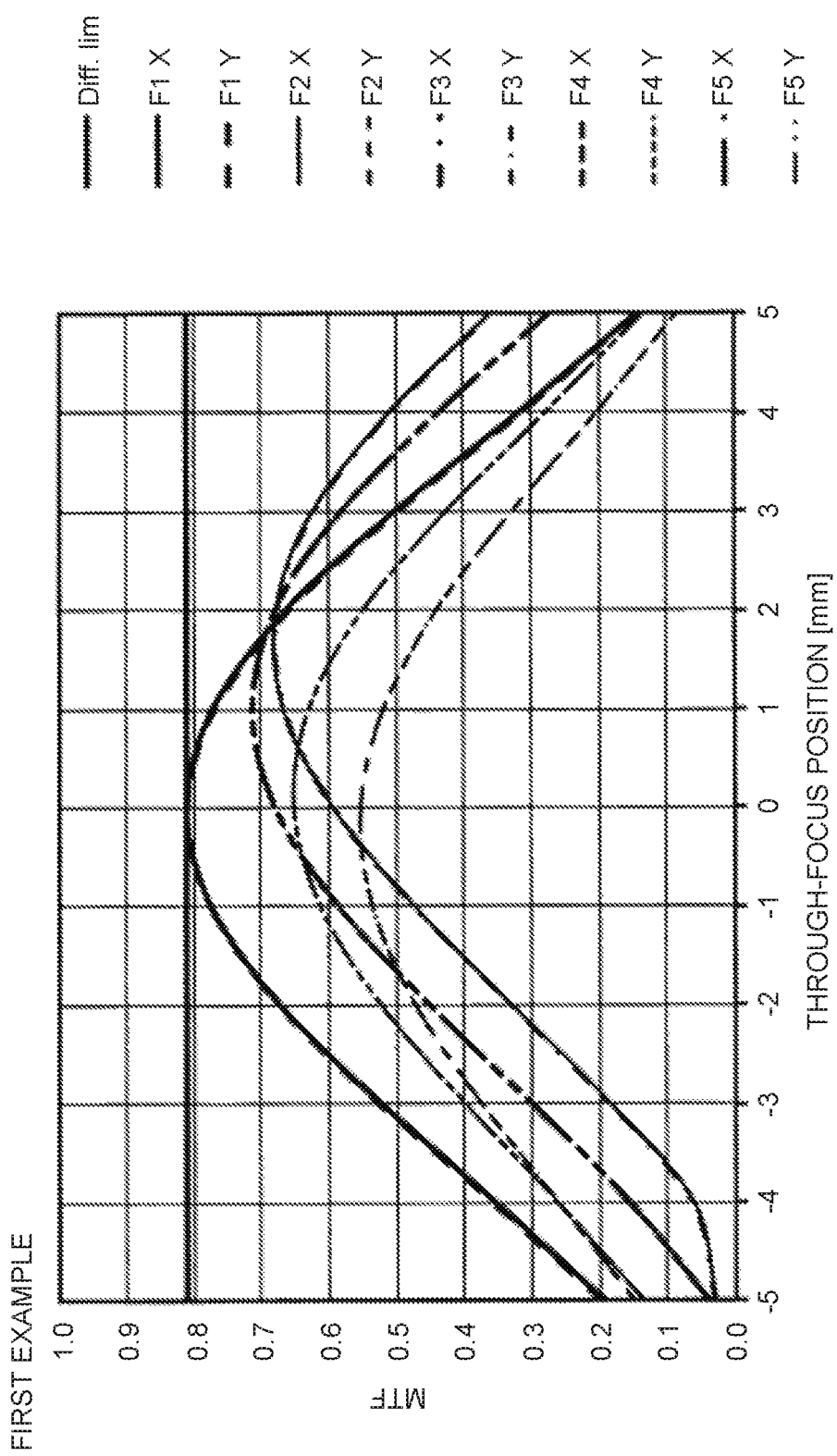
FIG. 10 is a graph for describing the ocular optical system in the first example.

FIG. 10 illustrates white light through-focus MTF at the Nyquist frequency. The MTF means image forming performance of the ocular optical system when reverse light beams are tracked from the eye to the image display device (that is, when regarded as an image forming optical system). In FIG. 10, the horizontal axis is an anteroposterior through-focus position (mm) with reference to an image plane (image display device surface) being 0. The vertical axis is MTF (contrast value). When the MTF is 10% (0.1) or more, it means that an image can be visually resolved.

In the first to fourth examples, the inch sizes of LCDs used as image display devices are different, and hence the pixel pitches are also different. In the first example, the Nyquist frequency calculated from the pixel pitch is 8 (lp/mm) as indicated in Table 1. Thus, in FIG. 10, the Nyquist frequency is 8 (lp/mm). Comparing Table 1 with Tables 3, 5, and 7 described below, it is understood that the Nyquist frequency becomes larger as the inch size becomes smaller. In other words, it is necessary to design a lens at a higher frequency, and the design difficulty increases.

FIG. 10 illustrates MTF in the vertical direction (Y-axis direction) and MTF in the horizontal direction (X-axis direction) at screen positions of F1: screen center, F2: screen lower left 70%, F3: screen upper left 70%, F4: screen lower right 70%, and F5: screen upper right 70%. Diffraction limit (Diff.lim) represents diffraction limit. It is understood from FIG. 10, the ocular optical system in the first example enables full-HD observation because an image is resolved up to the Nyquist frequency over the range of diagonal 70% from the center of a screen to the periphery of the screen. In this manner, it is understood that the ocular optical system in the first example exhibits excellent contrast and can provide a high-quality image to an observer.

Second Example

In a second example below, the same right and left ocular optical systems each having an ocular lens formed of two lenses illustrated in FIG. 4 were designed, and image forming simulation was performed.

The simulation assumed that a first polarization member 101 and a second polarization member 105 were present while being bonded to protective glass. As an image display device 107, a liquid crystal display panel (4.5 inch, half-diagonal: 57.0 mm) was used. The liquid crystal display panel is a liquid crystal display panel having a resolution of full-HD (1920×1080 pixels). Furthermore, an angle between a reflection surface of a mirror 103 and an optical axis of the ocular lens was 37 degrees.

Eye relief was at a position of 20 mm from a lens surface, and the distance (virtual image distance) from an eye to a virtual image of the liquid crystal display panel (LCD panel) was 550 mm. The right and left LCD panels were offset by 4.474 mm in the horizontal direction to set the binocular convergence distance to 870 mm. A reference interpupillary distance was 62 mm, and eye relief was set so as to respond to eye swinging of ±10.72 mm in the horizontal direction.

Other setting conditions are collectively indicated in Table 3 below. Lens parameters in the ocular optical system in the second example are as indicated in Table 4.

TABLE 3

|  |  | Second example |
|---|---|---|
| Image display unit | Panel (inch) | 4.5 |
|  | Panel V/2 (mm) | 28.0 |
|  | Panel H/2 (mm) | 49.7 |
|  | Pixel pitch (mm) | 0.052 |
|  | Nyquist frequency (lp/mm) | 10 |
| Ocular lens | Magnification β | 4.38 |
|  | Angular magnification γ | 1.27 |
|  | Focal length (mm) | 152.32 |
| Horizontal angle of view 2ω (deg) |  | 44.9 |
| Optical distortion diagonal (%) |  | −4.21 |
| Virtual image distance (mm) |  | 550 |
| Panel offset (mm) |  | 4.474 |
| Convergence distance (mm) |  | 870 |

TABLE 4

| Surface number | Surface name | Curvature of radius | Surface interval | d-line refractive index | d-line Abbe number | Aperture radius |
|---|---|---|---|---|---|---|
| Object | | ∞ | −550.0000 | | | |
| Stop surface | Eye relief | ∞ | 20.0000 | | | 2.0000 |
| 2 | Protective glass | ∞ | 1.1000 | 1.47140 | 65.53 | 18.9419 |
| 3 | First polarization member | ∞ | 0.2200 | 1.52512 | 56.28 | 19.1743 |
| 4 | | ∞ | 3.2000 | | | 19.2191 |
| 5 | First ocular lens | −168.3100 | 10.0000 | 1.77250 | 49.62 | 19.8697 |
| 6 | | −44.8600 | 0.5000 | | | 21.2176 |
| 7 | Second ocular lens | −47.3000 | 2.0000 | 1.84666 | 23.78 | 21.2228 |
| 8 | | −73.9500 | 39.8177 | | | 22.0615 |
| 9 | Mirror | ∞ | −73.1964 | | | 45.1404 |
| 10 | | ∞ | −5.5500 | | | 42.2285 |
| 11 | | ∞ | −2.0000 | | | 39.9432 |
| 12 | Second polarization member | ∞ | −0.2200 | 1.52512 | 56.28 | 40.5945 |
| 13 | Protective glass | ∞ | −0.8500 | 1.51680 | 64.17 | 40.6452 |
| 14 | | ∞ | −0.1000 | | | 40.8420 |
| Image | Image display unit | ∞ | 0.0000 | | | 40.8785 |

Figure 11:
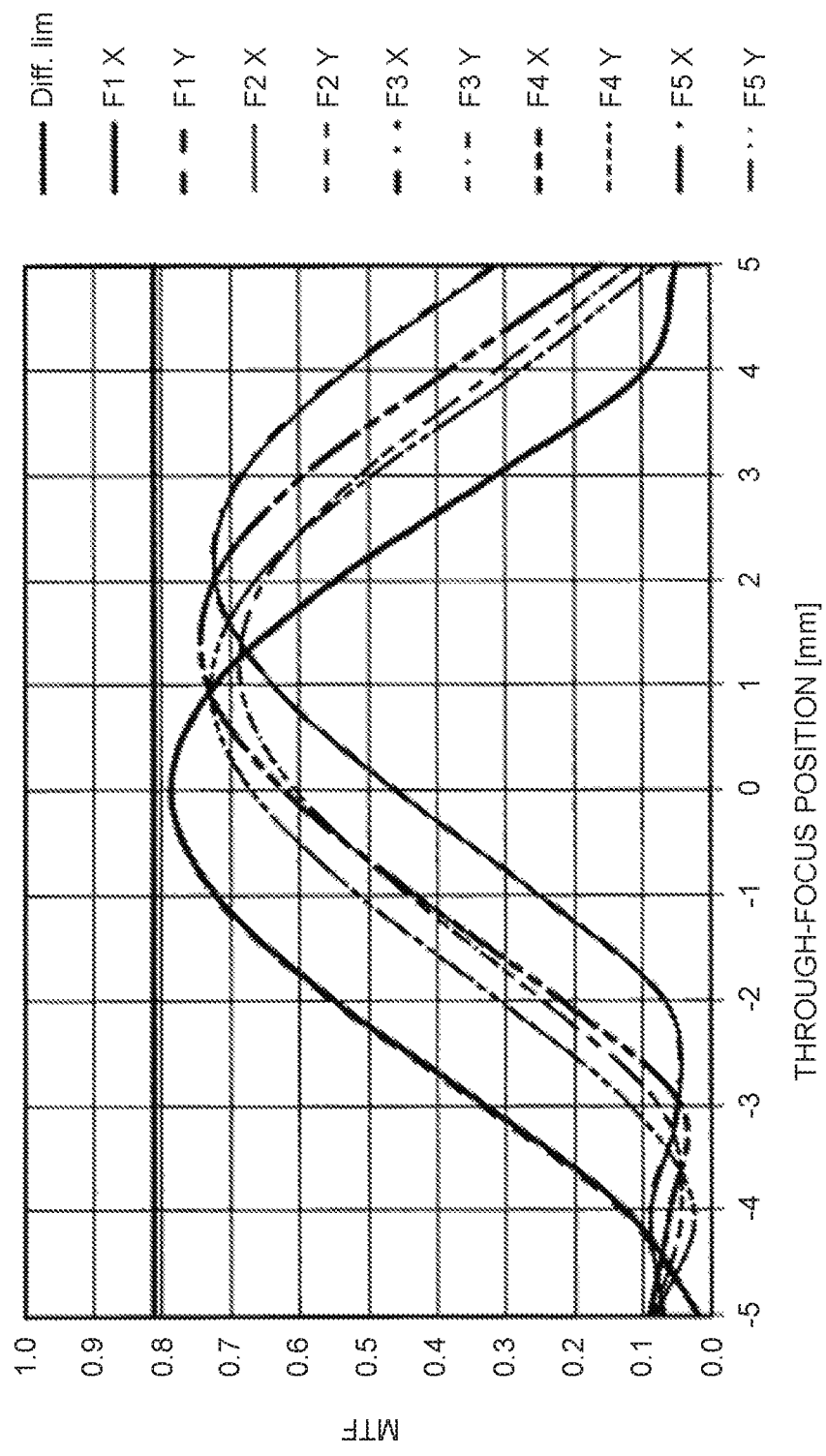
FIG. 11 is a graph for describing an ocular optical system in a second example.

FIG. 11 illustrates MTF in the ocular optical system obtained by the simulation. The notation system of MTF illustrated in FIG. 11 is the same as in the first example. It is understood from FIG. 11 that the ocular optical system in the second example enables full-HD observation because an image is resolved up to the Nyquist frequency over the range of diagonal 70% from the center of a screen to the periphery of the screen. In this manner, it is understood that the ocular optical system in the second example exhibits excellent contrast and can provide a high-quality image to an observer.

Third Example

In a third example below, the same right and left ocular optical systems each having an ocular lens formed of two lenses illustrated in FIG. 4 were designed, and image forming simulation was performed.

The simulation assumed that a first polarization member 101 and a second polarization member 105 were present while being bonded to protective glass. As an image display device 107, a liquid crystal display panel (4.0 inch, half-diagonal: 50.7 mm) was used. The liquid crystal display panel is a liquid crystal display panel having a resolution of full-HD (1920×1080 pixels). Furthermore, an angle between a reflection surface of a mirror 103 and an optical axis of the ocular lens was 37 degrees.

Eye relief was at a position of 20 mm from a lens surface, and the distance (virtual image distance) from an eye to a virtual image of the liquid crystal display panel (LCD panel) was 550 mm. The right and left LCD panels were offset by 3.986 mm in the horizontal direction to set the binocular convergence distance to 870 mm. A reference interpupillary distance was 62 mm, and eye relief was set so as to respond to eye swinging of ±10.72 mm in the horizontal direction.

Other setting conditions are collectively indicated in Table 5 below. Lens parameters in the ocular optical system in the third example are as indicated in Table 6.

TABLE 5

| | | Third example |
|---|---|---|
| Image display unit | Panel (inch) | 4.0 |
| | Panel V/2 (mm) | 24.9 |
| | Panel H/2 (mm) | 44.2 |
| | Pixel pitch (mm) | 0.046 |
| | Nyquist frequency (lp/mm) | 11 |
| Ocular lens | Magnification β | 4.92 |
| | Angular magnification γ | 1.31 |
| | Focal length (mm) | 131.57 |
| Horizontal angle of view 2ω (deg) | | 45.1 |
| Optical distortion diagonal (%) | | −4.77 |
| Virtual image distance (mm) | | 550 |
| Panel offset (mm) | | 3.986 |
| Convergence distance (mm) | | 870 |

TABLE 6

| Surface number | Surface name | Curvature of radius | Surface interval | d-line refractive index | d-line Abbe number | Aperture radius |
|---|---|---|---|---|---|---|
| Object | | ∞ | −550.0000 | | | |
| Stop surface | Eye relief | ∞ | 20.0000 | | | 2.0000 |

TABLE 6-continued

| Surface number | Surface name | Curvature of radius | Surface interval | d-line refractive index | d-line Abbe number | Aperture radius |
|---|---|---|---|---|---|---|
| 2 | Protective glass | ∞ | 1.1000 | 1.47140 | 65.53 | 19.0151 |
| 3 | First polarization member | ∞ | 0.2200 | 1.52512 | 56.28 | 19.2498 |
| 4 | | ∞ | 3.2000 | | | 19.2950 |
| 5 | First ocular lens | −213.4000 | 11.0000 | 1.77250 | 49.62 | 20.0287 |
| 6 | | −42.3600 | 0.5000 | | | 21.3875 |
| 7 | Second ocular lens | −43.6000 | 2.5000 | 1.84666 | 23.78 | 21.3537 |
| 8 | | −70.4000 | 39.8177 | | | 22.3602 |
| 9 | Mirror | ∞ | −60.1319 | | | 42.8282 |
| 10 | | ∞ | 0.0000 | | | 37.7561 |
| 11 | | ∞ | −6.8600 | | | 34.5716 |
| 12 | Second polarization member | ∞ | −0.2200 | 1.52512 | 56.28 | 36.1744 |
| 13 | Protective glass | ∞ | −0.8500 | 1.51680 | 64.17 | 36.2249 |
| 14 | | ∞ | −0.1000 | | | 36.4210 |
| Image | Image display unit | ∞ | 0.0000 | | | 36.4574 |

Figure 12:
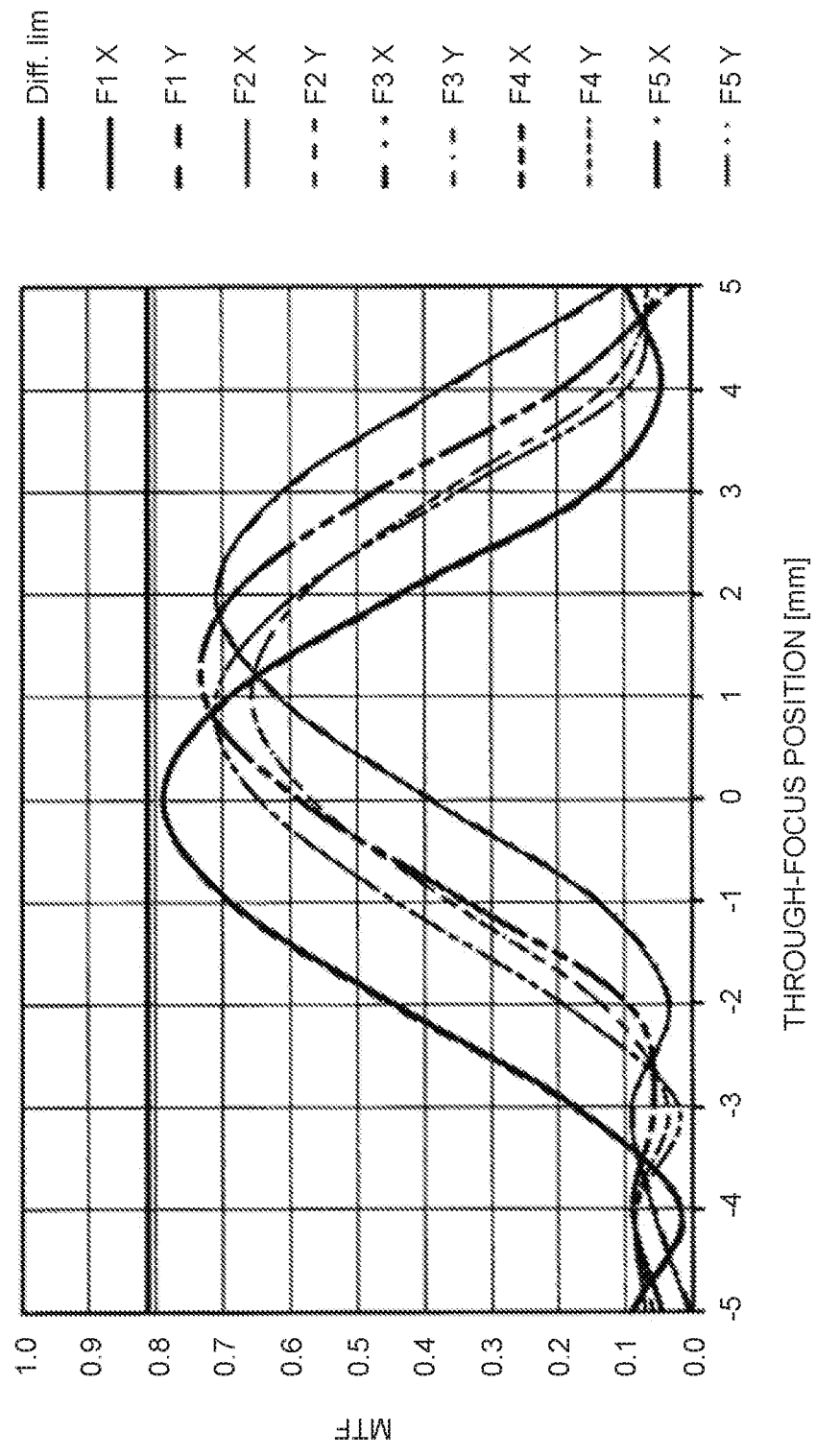
FIG. 12 is a graph for describing an ocular optical system in a third example.

FIG. 12 illustrates MTF in the ocular optical system obtained by the simulation. The notation system of MTF illustrated in FIG. 12 is the same as in the first example. It is understood from FIG. 12 that the ocular optical system in the third example enables full-HD observation because an image is resolved up to the Nyquist frequency over the range of diagonal 70% from the center of a screen to the periphery of the screen. In this manner, it is understood that the ocular optical system in the third example exhibits excellent contrast and can provide a high-quality image to an observer.

Fourth Example

Figure 13:
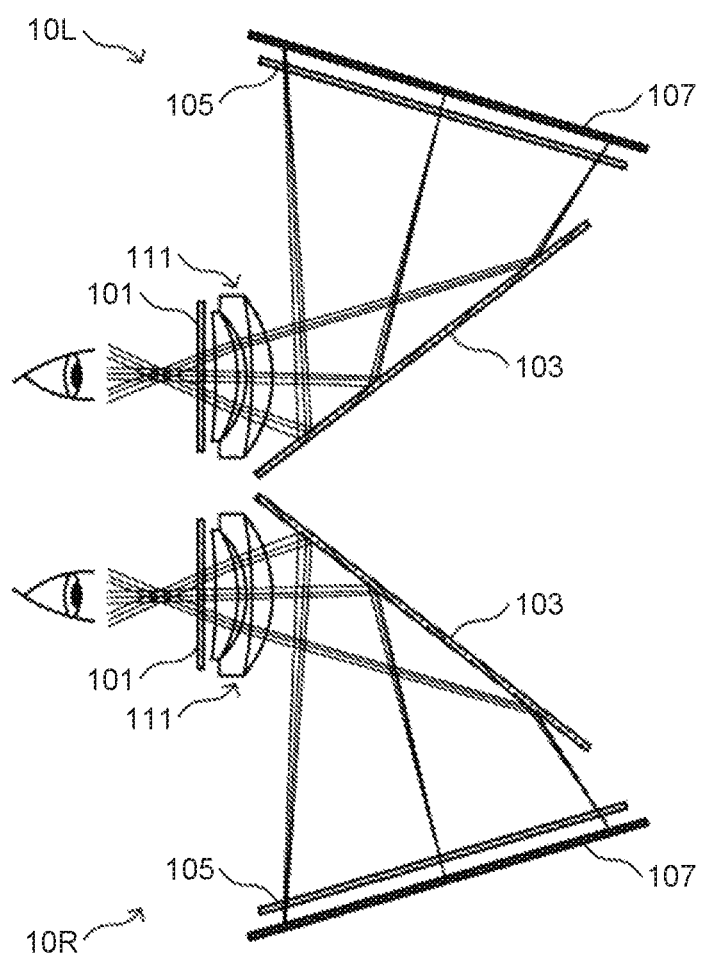
FIG. 13 is an explanatory diagram for describing an ocular optical system in a fourth example.

In a fourth example below, the same right and left ocular optical systems each having an ocular lens formed of three lenses illustrated in FIG. 13 were designed, and image forming simulation was performed.

The simulation assumed that a first polarization member 101 and a second polarization member 105 were present while being bonded to protective glass. As an image display device 107, a liquid crystal display panel (4.0 inch, half-diagonal: 50.7 mm) was used. The liquid crystal display panel is a liquid crystal display panel having a resolution of full-HD (1920×1080 pixels). Furthermore, an angle between a reflection surface of a mirror 103 and an optical axis of the ocular lens was 37 degrees.

Eye relief was at a position of 20 mm from a lens surface, and the distance (virtual image distance) from an eye to a virtual image of the liquid crystal display panel (LCD panel) was 550 mm. The right and left LCD panels were offset by 3.959 mm in the horizontal direction to set the binocular convergence distance to 870 mm. A reference interpupillary distance was 62 mm, and eye relief was set so as to respond to eye swinging of ±10.72 mm in the horizontal direction.

Other setting conditions are collectively indicated in Table 7 below. Lens parameters in the ocular optical system in the fourth example are as indicated in Table 8.

TABLE 7

| | | Fourth example |
|---|---|---|
| Image display unit | Panel (inch) | 4.0 |
| | Panel V/2 (mm) | 24.9 |
| | Panel H/2 (mm) | 44.2 |
| | Pixel pitch (mm) | 0.046 |
| | Nyquist frequency (lp/mm) | 11 |
| Ocular lens | Magnification β | 4.95 |
| | Angular magnification γ | 1.43 |
| | Focal length (mm) | 127.60 |
| Horizontal angle of view 2ω (deg) | | 45.7 |
| Optical distortion diagonal (%) | | −5.65 |
| Virtual image distance (mm) | | 550 |
| Panel offset (mm) | | 3.959 |
| Convergence distance (mm) | | 870 |

TABLE 8

| Surface number | Surface name | Curvature of radius | Surface interval | d-line refractive index | d-line Abbe number | Aperture radius |
|---|---|---|---|---|---|---|
| Object | | ∞ | −550.0000 | | | |
| Stop surface | Eye relief | ∞ | 20.0000 | | | 2.0000 |
| 2 | Protective glass | ∞ | 1.1000 | 1.47140 | 65.53 | 22.1154 |

TABLE 8-continued

| Surface number | Surface name | Curvature of radius | Surface interval | d-line refractive index | d-line Abbe number | Aperture radius |
|---|---|---|---|---|---|---|
| 3 | First polarization member | ∞ | 0.2200 | 1.52512 | 56.28 | 22.4551 |
| 4 | | ∞ | 3.2000 | | | 22.5205 |
| 5 | First ocular lens | −195.3200 | 8.4200 | 1.77250 | 49.62 | 23.3927 |
| 6 | | −60.1100 | 3.5800 | | | 24.7990 |
| 7 | Second ocular lens | −39.3900 | 3.0000 | 1.71736 | 29.50 | 24.8258 |
| 8 | Third ocular lens | −191.3500 | 10.0000 | 1.77250 | 49.62 | 29.0675 |
| 9 | | −48.0000 | 43.0000 | | | 29.8517 |
| 10 | Mirror | ∞ | −59.5662 | | | 67.7357 |
| 11 | | ∞ | −3.2840 | | | 52.8697 |
| 12 | | ∞ | −2.0000 | | | 50.2635 |
| 13 | Second polarization member | ∞ | −0.2200 | 1.52512 | 56.28 | 51.0092 |
| 14 | Protective glass | ∞ | −0.8500 | 1.51680 | 64.17 | 51.0609 |
| 15 | | ∞ | −0.1000 | | | 51.2627 |
| Image | Image display unit | ∞ | 0.0000 | | | 51.3037 |

FIG. 14 illustrates MTF in the ocular optical system obtained by the simulation. The notation system of MTF illustrated in FIG. 14 is the same as in the first example. It is understood from FIG. 14 that the ocular optical system in the fourth example enables full-HD observation because an image is resolved up to the Nyquist frequency over the range of diagonal 70% from the center of a screen to the periphery of the screen. In this manner, it is understood that the ocular optical system in the fourth example exhibits excellent contrast and can provide a high-quality image to an observer.

While exemplary embodiments of the present disclosure have been described above in detail with reference to the accompanying drawings, the technical scope of the present disclosure is not limited to the examples. It is obvious that a person with ordinary skills in the technical field of the present disclosure could conceive of various kinds of changes and modifications within the range of the technical concept described in the claims. It should be understood that the changes and the modifications belong to the technical scope of the present disclosure.

The effects described herein are merely demonstrative or illustrative and are not limited. In other words, the features according to the present disclosure could exhibit other effects obvious to a person skilled in the art from the descriptions herein together with or in place of the above-mentioned effects.

The following configurations also belong to the technical scope of the present disclosure.

(1)

An ocular optical system, including, on an optical path viewed from an observer side, at least:

a first polarization member;

a mirror;

a second polarization member; and an image display device in this order, wherein a polarized state in the first polarization member and a polarized state in the second polarization member are orthogonal to each other.

(2)

The ocular optical system according to (1), further including an ocular lens disposed on an optical path between the first polarization member and the mirror, wherein a lens surface of the ocular lens on the mirror side has a convex curvature.

(3)

The ocular optical system according to (2), wherein a relation of $3<\beta<5$ is satisfied, where B is a magnification of the ocular lens.

(4)

The ocular optical system according to (2) or (3), wherein a relation of $1.2<\gamma<1.5$ is satisfied, where γ is an angular magnification of the ocular lens.

(5)

The ocular optical system according to any one of (2) to (4), wherein, on a reflection surface of the mirror, a shield for blocking reflection light reflected by the mirror is provided near a position at which reflection light reflected by a lens surface of the ocular lens on the mirror side among light beams emitted from the image display device reaches the reflection surface of the mirror.

(6)

The ocular optical system according to any one of (1) to (5), wherein the first polarization member and the second polarization member are linear polarizing plates.

(7)

The ocular optical system according to any one of (1) to (5), wherein the first polarization member is a linear polarizing plate, and the second polarization member is a circular polarizing plate formed of a ¼ wavelength plate.

(8)

The ocular optical system according to any one of (1) to (5), wherein the first polarization member is a linear polarizing plate, and the second polarization member is a ½ wavelength plate.

(9)
The ocular optical system according to any one of (1) to (5), wherein
the first polarization member is a linear polarizing plate, and
the second polarization member is a polarization member in which a linear polarizing plate and a ½ wavelength plate are disposed in this order from the observer side.

(10)
A medical viewer, including an ocular optical system including, on an optical path viewed from an observer side, at least:
a first polarization member;
a mirror;
a second polarization member; and
an image display device in this order, wherein
a polarized state in the first polarization member and a polarized state in the second polarization member are orthogonal to each other.

(11)
A medical viewer system, including:
an image processing unit for performing image processing on an image in which a surgical site that is a site subjected to surgery is taken, and outputting an obtained surgical site taken image; and
a medical viewer for presenting the surgical site taken image output from the image processing unit to an observer, wherein
the medical viewer includes an ocular optical system including, on an optical path viewed from an observer side, at least:
a first polarization member;
a mirror;
a second polarization member; and
an image display device in this order, and
a polarized state in the first polarization member and a polarized state in the second polarization member are orthogonal to each other.

(12)
The medical viewer system according to (11), further including an image transmission unit for transmitting the surgical site taken image output from the image processing unit to the medical viewer.

REFERENCE SIGNS LIST 10 ocular optical system
101 first polarization member
103 mirror
105 second polarization member
107 image display device
111 ocular lens
200 medical viewer
300 surgical unit
301 imaging unit
303 surgical tool unit
400 image processing unit
500 image transmission unit
600 medical viewer system
700 operation unit
701 operation arm
703 operation pedal
1000 surgical system

The invention claimed is:
1. An ocular optical system, comprising, on an optical path viewed from an observer side, at least:
a first polarization member;
an ocular lens before or after the first polarization member;
a mirror;
a second polarization member; and
an image display device in this order, wherein
a polarized state in the first polarization member and a polarized state in the second polarization member are orthogonal to each other, wherein
the mirror changes the polarized state of light incident thereon to a state orthogonal thereto, and
a lens surface of the ocular lens facing the mirror has a convex curvature, wherein a direct light beam from the image display device not reflected on the mirror before being incident on the ocular lens or the first polarization member travels an optical path different from that of a light beam reflected on the mirror before being incident on the ocular lens or the first polarization member, wherein the direct light beam and the light beam reflected on the mirror are both incident on the second polarization member.

2. The ocular optical system according to claim 1, wherein a relation of $3<\beta<5$ is satisfied, where $\beta$ is a magnification of the ocular lens.

3. The ocular optical system according to claim 1, wherein a relation of $1.2<\gamma<1.5$ is satisfied, where $\gamma$ is an angular magnification of the ocular lens.

4. The ocular optical system according to claim 1, wherein, on a reflection surface of the mirror, a shield for blocking reflection light reflected by the mirror is provided near a position at which reflection light reflected by a lens surface of the ocular lens on the mirror side among light beams emitted from the image display device reaches the reflection surface of the mirror.

5. The ocular optical system according to claim 1, wherein the first polarization member and the second polarization member are linear polarizing plates.

6. The ocular optical system according to claim 1, wherein the first polarization member and the second polarization member are circular polarizing plates respectively formed of a linear polarizing plate and a ¼ wavelength plate.

7. The ocular optical system according to claim 1, wherein the first polarization member is a linear polarizing plate, and
the second polarization member is a ½ wavelength plate.

8. The ocular optical system according to claim 1, wherein the first polarization member is a linear polarizing plate, and
the second polarization member is a polarization member in which a linear polarizing plate and a ½ wavelength plate are disposed in this order from the observer side.

9. A medical viewer, comprising an ocular optical system including, on an optical path viewed from an observer side, at least:
a first polarization member;
an ocular lens before or after the first polarization member;
a mirror;
a second polarization member; and
an image display device in this order, wherein
a polarized state in the first polarization member and a polarized state in the second polarization member are orthogonal to each other, wherein
the mirror changes the polarized state of the light incident thereon to a state orthogonal thereto, and
a lens surface of the ocular lens facing the mirror has a convex curvature, wherein a direct light beam from the image display device not reflected on the mirror before being incident on the ocular lens or the first polarization member travels an optical path different from that of a light beam reflected on the mirror before being incident on the ocular lens or the first polarization member, wherein the direct light beam and the light beam reflected on the mirror are both incident on the second polarization member.

10. A medical viewer system, comprising:

circuitry configured to perform image processing on an image in which a surgical site that is a site subjected to surgery is taken, and output an obtained surgical site taken image; and a medical viewer for presenting the surgical site taken image output from the circuitry to an observer, wherein the medical viewer includes an ocular optical system including, on an optical path viewed from an observer side, at least:

a first polarization member;
ocular lens before or after the first polarization member;
a mirror;
a second polarization member; and
an image display device in this order, and a polarized state in the first polarization member and a polarized state in the second polarization member are orthogonal to each other, wherein the mirror changes the polarized state of the light incident thereon to a state orthogonal thereto, and a lens surface of the ocular lens facing the mirror has a convex curvature, wherein a direct light beam from the image display device not reflected on the mirror before being incident on the ocular lens or the first polarization member travels an optical path different from that of a light beam reflected on the mirror before being incident on the ocular lens or the first polarization member, wherein the direct light beam and the light beam reflected on the mirror are both incident on the second polarization member.

11. The medical viewer system according to claim 10, wherein the circuitry is further configured to transmit the surgical site taken image to the medical viewer.

* * * * *